United States Patent [19]

Evans, Jr.

[11] Patent Number: 4,912,753

[45] Date of Patent: Mar. 27, 1990

[54] ROBOT AXIS CONTROLLER EMPLOYING FEEDBACK AND OPEN LOOP (FEEDFORWARD) CONTROL

[75] Inventor: Daniel D. Evans, Jr., Oceanside, Calif.

[73] Assignee: Hughes Aircraft Company, Los Angeles, Calif.

[21] Appl. No.: 177,564

[22] Filed: Apr. 4, 1988

[51] Int. Cl.$^4$ .............................................. G06F 15/00
[52] U.S. Cl. .................................. 364/513; 364/165; 364/167.01
[58] Field of Search ........... 364/513, 164, 165, 167.01, 364/568.11; 318/571, 568

[56] References Cited

U.S. PATENT DOCUMENTS

| | | | |
|---|---|---|---|
| Re. 30,016 | 5/1979 | Hohn | 364/474 |
| 3,612,976 | 10/1971 | Tripp | 235/151.11 |
| 3,798,430 | 3/1974 | Simon et al. | 235/151.11 |
| 3,879,898 | 4/1975 | Loxham et al. | 51/33 W |
| 3,940,794 | 2/1976 | Griffiths et al. | 360/99 |
| 4,011,437 | 3/1977 | Hohn | 235/151.11 |
| 4,041,287 | 8/1977 | Kolell et al. | 235/151.11 |
| 4,061,952 | 12/1977 | Dinsdale et al. | 318/572 |
| 4,093,904 | 6/1978 | Burig et al. | 318/616 |
| 4,267,736 | 5/1981 | Westbeck | 74/5.22 |
| 4,297,734 | 10/1981 | Laishley et al. | 360/78 |
| 4,302,666 | 11/1981 | Hawkins | 235/404 |
| 4,345,194 | 8/1982 | Green | 318/621 |
| 4,389,618 | 6/1983 | Bauman | 330/149 |
| 4,396,049 | 2/1981 | Calvert et al. | 144/204 R |
| 4,533,991 | 8/1985 | Georgia | 364/164 |
| 4,535,372 | 8/1985 | Yeakley | 360/77 |
| 4,594,622 | 6/1986 | Wallis | 360/77 |
| 4,595,027 | 6/1986 | Higgins et al. | 131/280 |
| 4,617,637 | 10/1986 | Chu et al. | 364/505 |
| 4,653,360 | 3/1987 | Compton | 82/18 |
| 4,680,521 | 7/1987 | Hofman | 318/649 |
| 4,807,153 | 2/1989 | Onaga et al. | 364/513 |

FOREIGN PATENT DOCUMENTS

| | | |
|---|---|---|
| 320163 | 6/1989 | European Pat. Off. |
| 2254056 | 7/1985 | France. |
| 2000612 | 1/1979 | United Kingdom. |

OTHER PUBLICATIONS

General Motors Research Laboratories Research Report MA-366, AES-87-014, entitled "Robodrive Phase I: A Single Axis Implementation of an Advanced Robot Control Algorithm," reported by Loran D. Brooks and Robert M. Goor, pp. 1-59.
Schematic of Robodrive Single Axis Control Algorithm, FIG. 2.2, from General Motors Research Laboratories (single page).
Goor, An Adaptive Feedforward Approach to Robot Control, 1986, Conference on Intelligent Systems and Machines, Apr. 29-30, 1986.
Goor, A New Approach to Minimum Time Robot Control, pp. 1-11.
Goor, A New Approach to Robot Control, pp. 387-389.

*Primary Examiner*—Allen MacDonald
*Attorney, Agent, or Firm*—Joseph E. Szabo; Wanda K. Denson-Low

[57] ABSTRACT

A digital robotic axis controller which employs a digital processor to apply the inverse of a plant model transfer function to positional information representative of a target path to generate a feed forward position control signal and to combine an error signal with the positional information to generate a feedback control signal. The feed forward and feedback control signals are combined to produce a total position control signal which is supplied to a digital-to-analog converter and then to a plant comprising an amplifier, a motor for establishing the actual position of a robotic member, and an encoder for deriving the error signal from the motor position. In application, a number of such plants are controlled to achieve a coordinated multidimensional movement with increased accuracy.

20 Claims, 7 Drawing Sheets

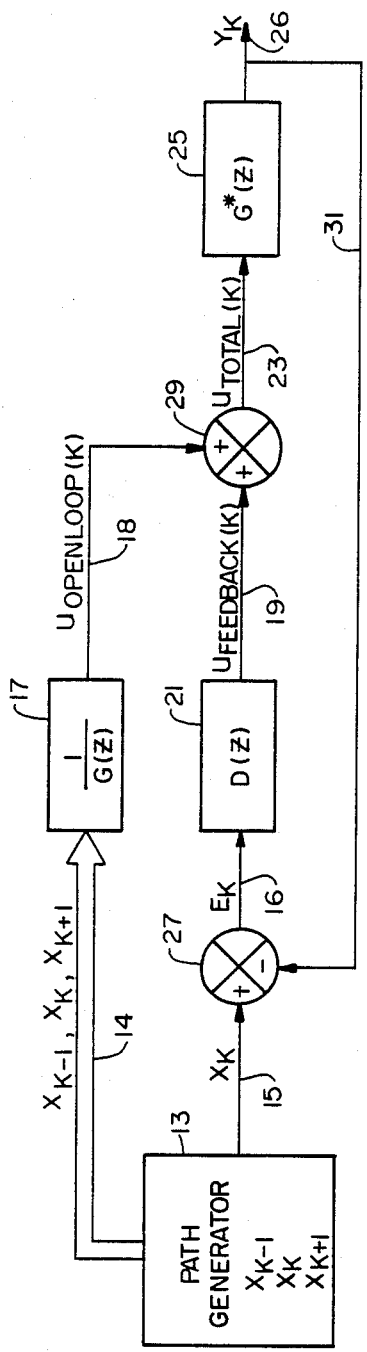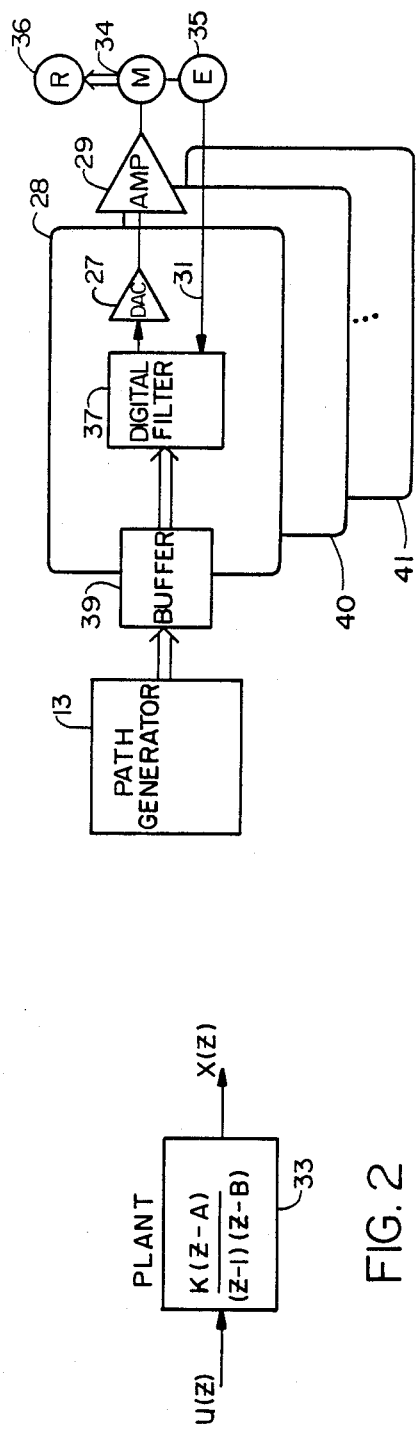
FIG. 1
FIG. 2
FIG. 3

ROBOT AXIS CONTROLLER EMPLOYING FEEDBACK AND OPEN LOOP (FEEDFORWARD) CONTROL

BACKGROUND OF THE INVENTION

1. Field of the Invention

The subject invention relates to apparatus for generating control signals for positioning mechanical apparatus, and more particularly to an axis controller for positioning robotic members.

2. Description of Related Art

Commercial robot control algorithms are typically based on feedback of the error between the target position to which the robot is commanded to move and the actual axis position to which it moves. Tracking errors are inherent in pure feedback control systems since errors are required to produce a feedback driving signal.

Commercial robot control algorithms differ as to particulars, but share in common the fact that they are based on error (and derivative) feedback. Such error-driven controls yield large dynamic tracking errors, approximately proportional to the command velocity. Thus, traditional control algorithms yield a trade-off between speed and accuracy for each axis motor employed in the robot. Axis coordination is achieved by planning axis target paths that combine to generate the desired trajectory. Since axes will typically travel at different velocities, axis errors will not be coordinated. Additionally, robot arm coordination deteriorates with increasing speed. Accordingly, under the traditional control, an error "budget" is specified, which determines a maximum acceptable error, and robot speed is restricted so that the error remains within the predefined limits.

While every commercial robot is equipped with its own unique motion controller, one universal aspect of robot control is that the input to the motor which controls robot movement on an axis is a voltage. How this voltage is generated varies from robot to robot. Typically, the voltage is the output of a power amplifier, which serves to translate digital control commands into an analog voltage signal for the motor input. The specific choice of power amplifier, current or voltage mode, determines the nature of this translation, and therefore the nature of the digital command. Thus, the selection of a power amplifier is part of the design of the control algorithm itself.

A power amplifier is also a power regulator in that it functions to control an aspect of the motor power to a specified level. The particular aspect controlled depends on the specified motor characteristic which is fed back. A so-called current mode amplifier feeds back the motor armature current and varies the armature voltage in such a way as to attempt to make the armature current, i, equal to a command current, $i_c$, calculated by the computer controller. This is the most common form of motion control amplifier.

For position control, there are several disadvantages of current mode amplifiers. One is that the motor command signal must be devoted primarily to acceleration as opposed to control at constant speed. Another is that current is more sensitive to torques, which are nonlinear and difficult to predict computationally.

A voltage mode amplifier feeds back and maintains the motor voltage proportional to the input voltage. There are several advantages of voltage mode amplifiers for position control. One is that the input is proportional to a motor voltage, which is proportional to motor speed. This proportionality makes voltage mode amplification inherently more stable than current modes for position control systems. Another is that the motor command signal range may be spent on control of constant velocity.

Another consideration common to design of commercial robot control algorithms is the level of smoothness of the target paths. Most target paths have continuous position and velocity profiles with jump discontinuities in the acceleration. Other types of target paths also include continuous acceleration profiles. The subject invention concerns command paths of the former type, i.e., those having jump discontinuities in the acceleration profile, but would also function with continuous acceleration. The control signal necessary for tracking of the target positions is provided to, for example, a power amplifier from a digital servo and data describing a desired target path crucial to operation of the robot. As noted, the tracking of the target positions contains inherent errors where traditional feedback algorithms are used.

Another approach to control algorithms is so-called feed forward or "open loop" control. In simulation and in theory, open loop control can track a smooth target path with zero error if the robot dynamics are known. Because of unknown loads, manufacturing variances, and other factors, however, these dynamics can never be known with absolute accuracy. Under pure open loop control, these uncertainties in the robot dynamics lead to position errors during the robot's motion.

Thus, both feedback and open loop control algorithms exhibit drawbacks which contribute to errors in positioning of robot elements.

SUMMARY OF THE INVENTION

It is therefore an object of the invention to improve robot control mechanisms;

It is another object of the invention to provide an improved control approach for mechanical positioning apparatus;

It is still another object of the invention to provide a control mechanism for tracking target path positions which is more accurate than either feedback or open loop control systems when utilized alone; and It is another object of the invention to provide such a control mechanism which avoids the use of current mode amplifiers.

According to the invention, digital servo path tracking errors are significantly reduced by utilizing feedback control in combination with open loop control. The open loop control is implemented through generation of an open loop control signal based on a system open loop plant model and the target path positions. The control signal is referred to as "open loop," because it is computed based solely on the desired path and does not depend on any tracking errors that may be present in the actual system. The total command signal is computed by summing the open loop control signal and a feedback control signal. The open loop control signal drives the system to near zero tracking error, allowing the feedback control to operate only on errors resulting from external disturbances and model inaccuracies. The combination of open loop (feed forward) control and feedback control has significantly reduced system errors in practice.

BRIEF DESCRIPTION OF THE DRAWINGS

FIG. 1 is a system block diagram of the preferred embodiment;

FIG. 2 illustrates a particular plant transfer function according to the preferred embodiment;

FIG. 3 is a functional block diagram of circuitry for implementing the preferred embodiment;

DETAILED DESCRIPTION OF THE PREFERRED EMBODIMENT

Figure 4:
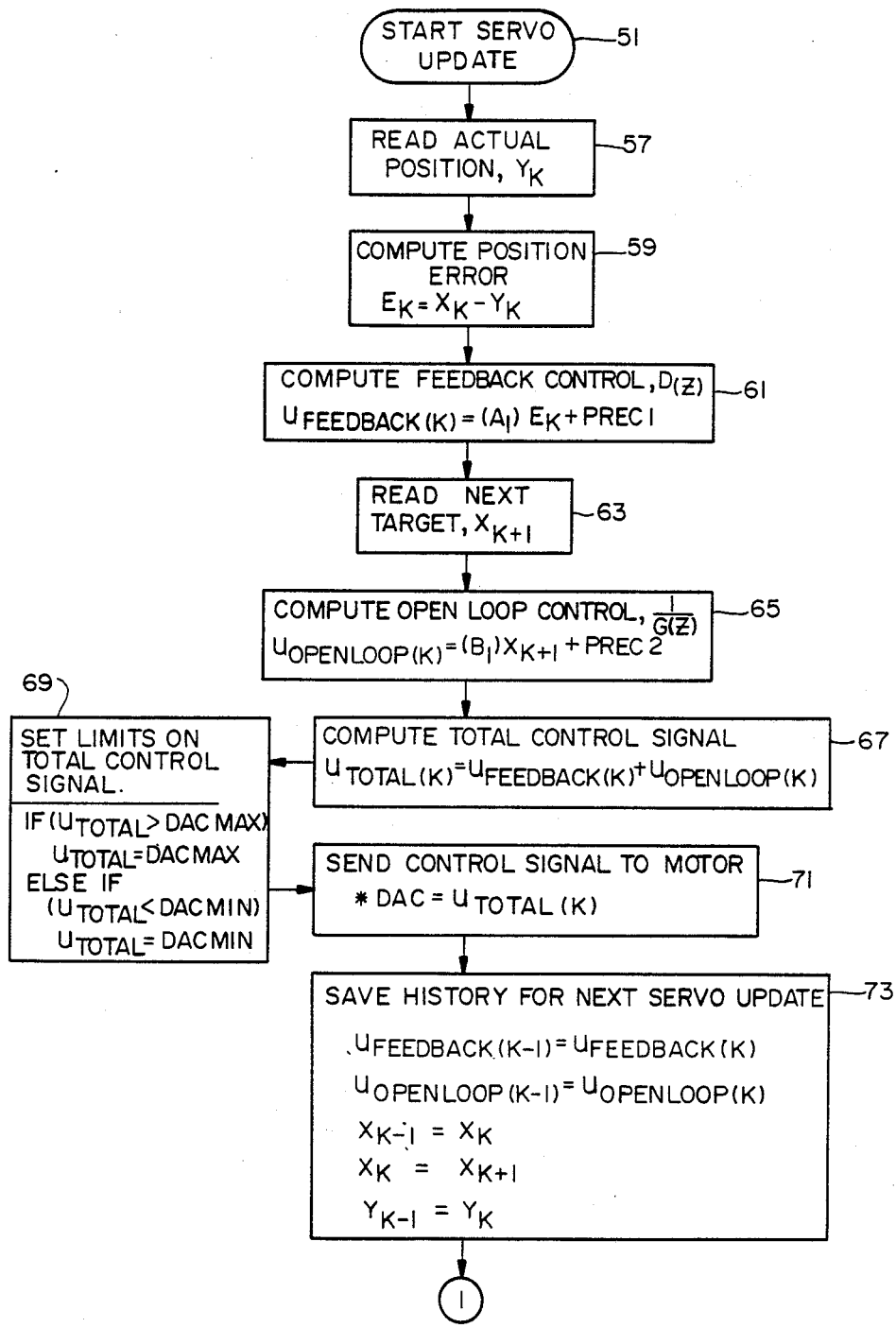
FIGS. 4 and 5 illustrate a flow chart for implementing the digital filter of FIG. 3 in a microprocessor.

The feedforward system of the preferred embodiment is shown in FIG. 1. It includes a path generator 13, which outputs desired path position data $X_{k-1}$, $X_k$, $X_{k+1}$ and $X_k$ over respective output lines 14, 15. The path data $X_{k-n}$ is the path position data for one-dimensional path motion.

The output line 14 of the path generator 13 is connected to the input of a computing element 17 which applies a transfer function $1/G(Z)$ to the path data and outputs an open loop control voltage $U_{open\ loop\ (k)}$ on a line 18. The line 15 is connected as one input to a summer 27 which outputs an error signal $E_k$ on a line 16 to a computational element 21. The computational element 21 applies a feedback control transfer function $D(Z)$ on the input $E_k$ and outputs a feedback control voltage $U_{feedback\ (k)}$ on a line 19. Lines 18 and 19 are connected to a summer 29 which adds the open loop and feedback control voltages $U_{open\ loop}$, $U_{feedback\ (k)}$ to produce a total output control voltage $U_{total\ (k)}$ on a line 23. The line 23 is applied to the actual plant 25, which results in an actual path location or position $Y_k$, which is outputted on a line 26. The actual path location $Y_k$ is also fed back to the first summer 27 and subtracted from the desired path signal $X_k$ to yield the feedback error signal $E_k$, $E_k = X_k - Y_k$. The transfer function of the actual plant 25 is represented by $G^*(Z)$.

FIG. 2 shows an example of an actual plant 33, with an input voltage $U(Z)$ resulting in an output position $X(Z)$. The digital transfer function of this plant 33 is $$G^*(Z) = \frac{K(Z - A)}{(Z - 1)(Z - B)} \quad (1)$$

$G^*(Z)$ represents a plant including the voltage mode amplifier, motor, load and encoder, as illustrated, for example, in FIG. 3, to be described in further detail below.

In application of the open loop and feedback control described to a digital servo positioning system for a wire bonder, the feedback control, $D(z)$, is a standard lead-lag control based on the present error and is implemented in difference equation form, i.e., $(U_{feedback\ (k)} = (A_1)\ Error_k - (A_2)\ Error_{k-1} + (A_3)\ U_{feedback\ (k-1)})$, where the parameters $A_1$, $A_2$, and $A_3$ are chosen to yield a stable system. While in this case a lead-lag control is employed, the feedback control can be any one of the many conventional forms used in the industry.

The open loop control is generated by solving a difference equation derived from the plant model $G(z)$, which represents the dynamics of a DC motor, amplifier, lead screw, load and encoder. The open loop difference equation is solved for $U_{open\ loop\ (k)} = (B_1) X_{k+1} - (B_2) X_k + (B_3) X_{k-1} + (B_4) U_{open\ loop\ (k-1)}$. An equation of this form is called noncausal since the computation of the present control, $U_{open\ loop\ (k)}$, requires the knowledge of a future event, namely $X_{k+1}$. Noncausal equations are not possible in feedback control since a future error, $E_{k+1}$ is not known. However, the open loop calculation requires the future target point, $X_{k+1}$ along the path. In a digital positioning system, such as the one under discussion, the target positions are precomputed using the well-known trapezoidal velocity profile and are thus available. If the target positions are not known in advance, then the target command could be delayed one sample period. Thus, the next target would be known one sample period before it is commanded.

To illustrate, a difference equation may be found which will predict $U_k$ for $X_{k+1}$ for the plant shown in FIG. 2. The transfer function $G^*(Z)$ is inverted as follows:

$$\frac{1}{G(Z)} = \frac{U(Z)}{X(Z)} = \frac{(Z-1)(Z-B)}{K(Z-A)} \quad (2)$$

Simplifying this equation (2) yields:

$$U_K = \frac{1}{K}[X_{K+1} - (1 + B)X_K + (B)X_{K-1} + (KA)U_{K-1}] \quad (3)$$

Thus, $U_k$ is a feed-forward value which is dependent on the plant parameters (dynamics) and the next desired position $X_{k+1}$. Equation (3) is implemented by computing element 17 in FIG. 1. Equation (3) may also be rewritten in terms of velocities $V_n$ as follows:

$$U_K = \left(\frac{1}{K}\right)[V_K - (B)V_{K-1} + AU_{K-1}] \quad (4)$$

A hardware embodiment of the preferred embodiment is illustrated in FIG. 3. This embodiment includes a path generator 13, a buffer 39, a digital control card 28, an amplifier 29, a motor 34, and an encoder 35. The motor 34 controls movement of a robotic member 36 such as a mechanical arm along a selected axis, as is well known in the art.

The digital control card or control section 28 includes a digital filter 37 embodied in, for example, a Motorola 68000 microprocessor operating at 12-½ MHz. The digital filter 37 may also be embodied in various forms of digital logic, other programmed processors, or special purpose signal processor circuitry.

The digital filter 37 performs the function of the filter 17, filter 21, and summing junctions 27 and 29 in FIG. 1 The digital filter 37 receives the path or trajectory information provided by the path generator 13 and stored in the buffer 39. The digital filter 37 outputs the total control signal $U_{total}$ to the digital-to-analog converter 27. The digital-to-analog converter 27 in turn provides an analog control signal to the amplifier 29 for controlling the motor 34. The encoder 35 tracks the actual motor position and provides a feedback signal on line 31 to the digital filter 37. The DAC 27, amplifier 29, motor 34, encoder 35, and load 36 comprise the plant 25 illustrated in FIG. 1 having the transfer function G*(Z).

As illustrated schematically by cards 40, ... 41, according to the preferred embodiment, seven additional cards and corresponding digital filters, amplifier, motor and encoder circuits may be provided in order to control up to eight-dimensional motion. Each additional card 40 ... 41 contains its own buffer 39. Each buffer 39 receives path data for controlling motion on its particular dimension. The buffer 39 of card 28 may receive X path data, buffer 39 of card 40 may receive Y path data, and the buffer 39 of card 41 may receive Z path data. Other dimensions include roll, pitch, yaw, etc., as known in the robotics art.

In an actual embodiment, a Pacific Scientific 2VM-62020-7 DC servo motor has been used for the motor 34 and a Disk Instruments rotary optical encoder M-98A-1000-ICLP yielding 4,000 counts per revolution with quadrature has been used for encoder 35. In that embodiment, the amplifier 29 is a 40-volt, 12-amp Glentek GA45555 linear voltage mode amplifier. The digital-to-analog converter 27 is a Burr-Brown AD667.

Figure 5:
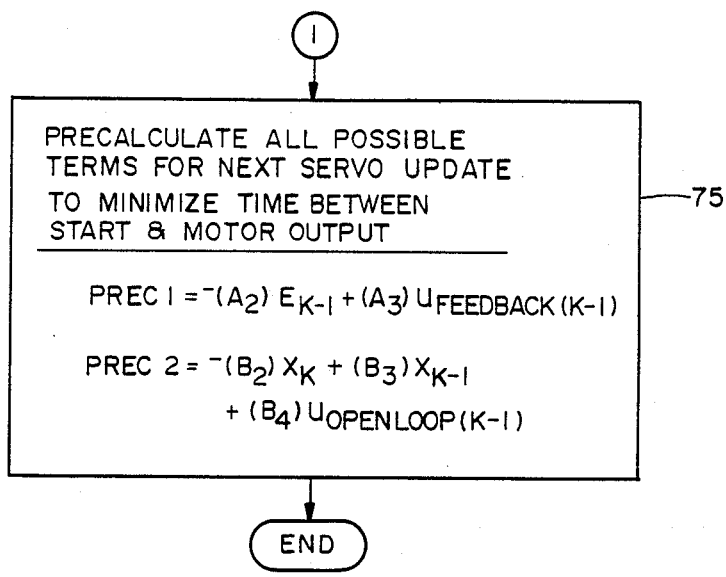

A flowchart for programming the Motorola 68000 microprocessor to perform the digital filtering functions of digital filter 37 is illustrated in FIGS. 4 and 5. Performance of the routine starts at the beginning of every sample period with step 51. Execution of the filter algorithm continues sequentially with steps 57, 59, 61, etc. of FIGS. 4 and 5. The entire algorithm is computed within the sample period. The algorithm is performed autonomously by each digital filter 37 on each card 28, 40 ... 41 for the respective dimension whose path data is supplied to that card through the associated buffer 39.

The actual position of the motor 34 is indicated over line 31 and is read at step 57. In step 59, the position error, $E_k = X_k - Y_k$, is determined in accordance with the summing junction 27 in FIG. 1. In step 61, the feedback control D(z) is computed. This term D(z) is computed by multiplying a constant $A_1$ times the error signal $E_k$ and adding to it a quantity denoted Prec 1, which is a precalculated quantity, as described hereafter. In step 63, the next target, $X_{k+1}$ is read from the buffer 39 into the processor. As illustrated in step 65, the open loop control parameter is calculated by multiplying a constant $B_1$ times $X_{k+1}$ and adding to it a second precalculated value Prec 2 as described hereafter. In the next step 67, the total control signal is determined in accordance with the summing junction 29 in FIG. 1.

In step 69, a limit test is performed on the total control signal $U_{total}$. The signal, $U_{total}$, is compared to parameters denoted DACMAX and DACMIN and clipped if necessary. These parameters are selected to limit the input voltage signal within a range matched to the amplifier 29. The control signal $U_{total}$ is then sent to the DAC 27 and then to the amp 29 and motor 34 in step 71. The parameters determined during this servo update are saved in step 73 for the next servo update 51. The routine then proceeds to block 75, where all possible terms for the next servo update 51 are calculated to minimize the time between the beginning of the sample period, step 51, and the output of $U_{total}$ to the DAC/amp/motor, step 73. In this step 75, to two parameters previously referred to Prec 1 and Prec 2 are calculated according to the equations established.

In a preferred embodiment, all history terms are initially set to zero. The sample period is 1 millisecond and generates a high priority interrupt to the processor so that the beginning of the digital servo algorithm is synchronized to the beginning of every sample period. The path generator 13 can be run before starting the move or concurrently therewith. The path generator 13 may read out previously-stored path information, or may be a computer which calculates detailed trajectory data for a target path in response to general position commands, as desired.

Figure 6A:
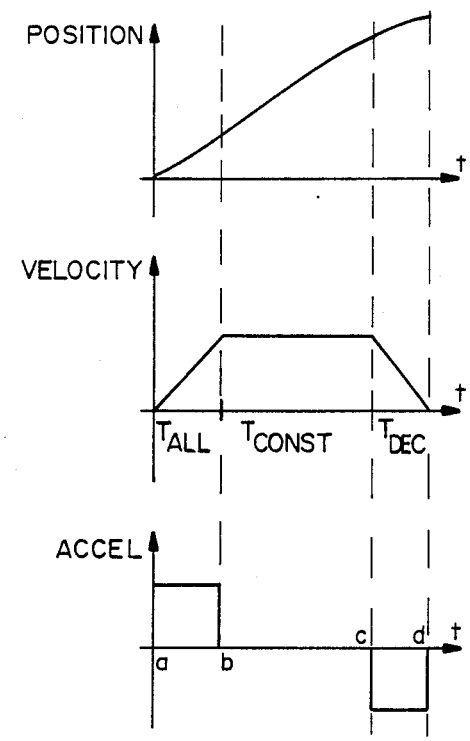
FIGS. 6a and 6b illustrate a typical trapezoidal velocity profile with the corresponding positions and accelerations.
Figure 6B:
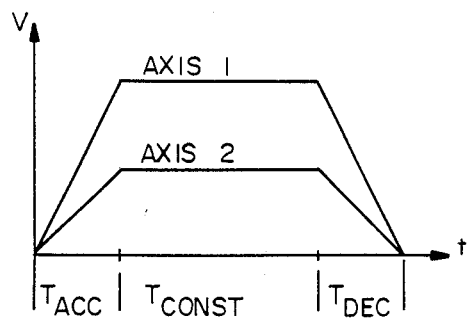

FIGS. 6a and 6b illustrate typical profiles to which the preferred embodiment is applicable. FIG. 6a shows the position, velocity and acceleration profiles for a single axis point-to-point move under trapezoidal velocity profile constraints. A trapezoidal velocity profile has the inherent position and acceleration versus time profiles shown in FIG. 6a. Notice that the acceleration has jump discontinuities at times a, b, c and d.

FIG. 6b illustrates the velocity profiles of two coordinated axes which are each moving a distance equal to the area under their respective velocity curves. Note that the acceleration, deceleration and constant velocity duration times must be set equal for true coordination. The ratio of the peak velocities, accelerations and decelerations are set equal to the ratio of the move distances between axes. For peak performance, the axis which is limiting reduction of the move time is run at peak acceleration, deceleration and speed. The other axis parameters are scaled down according to the position ratios described above. Thus, according to the preferred embodiment, motion on multiple axes is coordinated by controlling position and velocity through the whole range of the move.

Figure 7:
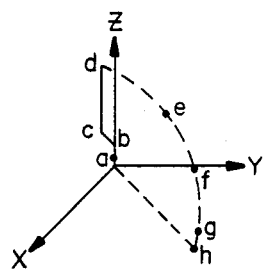
FIG. 7 illustrates a move in XYZ coordinates executable by the preferred embodiment.
Figure 8:
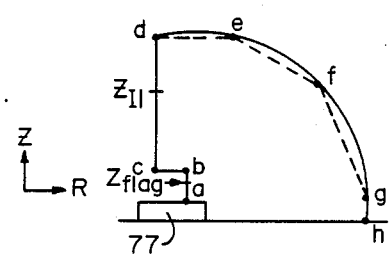
FIG. 8 illustrates the move of FIG. 7 in an ZR coordinate system.

FIGS. 7 and 8 illustrate a typical three-dimensional move accomplished according to the preferred embodiment. The move particularly illustrated is movement of a wire by a wire bonding apparatus with respect to a part 77.

Figure 9:
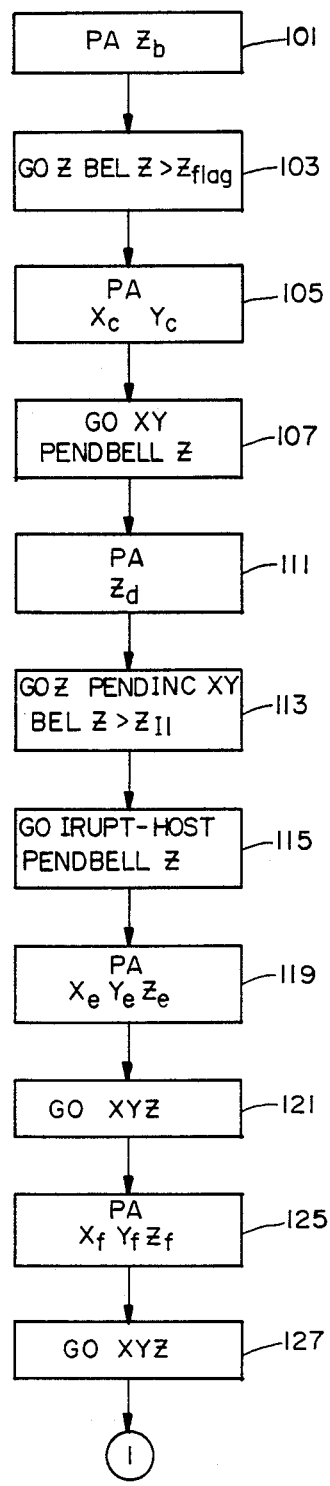
FIGS. 9 and 10 illustrate steps in executing the move of FIGS. 7 and 8.
Figure 10:
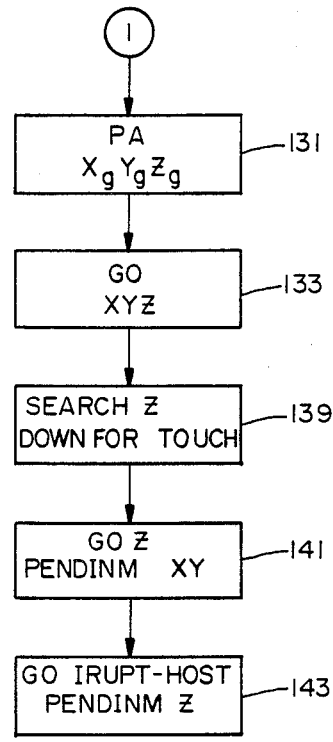

FIG. 7 shows the three-dimensional move in XYZ coordinates, while FIG. 8 illustrates the move mapped into a Z and "R" axis where the R axis is composed of X and Y and forms a straight line from "a" to "h" in the XY plane. FIGS. 9 and 10 illustrate exemplary steps for executing the movements depicted by FIGS. 7 and 8. The moves comprise seven segments, as follows:

| No. | Segment | Description |
| --- | --- | --- |
| 1 | a-b | Lift Z axis off part. |
| 2 | b-c | XY axis move that can begin once Z is above a height denoted $Z_{flag}$. |
| 3 | c-d | Z axis move where notification once Z is above a height $Z_{f1}$ is requested. |
| 4 | d-e | XYZ move to approximate first part of an arc dg. |
| 5 | e-f | XYZ move to approximate second part of the arc dg. |
| 6 | f-g | XYZ move to approximate third part of the arc dg. |
| 7 | g-h | Special Z axis move that searches down for touch with a surface. Notification once Z search is complete is requested. |

In the first step 101, the path generator 13 supplies the digital filter 37 for the Z axis with the target position array required to move the Z axis to $Z_b$. The command 103 denoted "GO Z BEL $Z > Z_{flag}$" is then executed wherein the digital filter 37 performs the routine illustrated in FIGS. 4 and 5 to bring the robot member to position b on the Z axis. The bell condition BEL Z $> Z_{flag}$ is set up in step 103 to indicate when the actual Z value is greater than $Z_{flag}$ so that the XY motion to $X_c$, $Y_c$ can begin once Z is above some obstacle located at the height denoted by $Z_{flag}$.

The flow then proceeds to step 105 wherein the position arrays required to move the X axis to $X_c$ and the Y axis to $Y_c$ are supplied to the path control hardware by the path generator 13. In step 107, after the bell condition $Z > Z_{flag}$ is satisfied, a "GO XY" command is executed to bring X and Y to $X_c$, $Y_c$, thereby completing segment bc.

To generate segment cd, step 111 is executed wherein the position array to move Z to $Z_d$ is supplied by the path generator 13 to the position controller. According to the "GO Z PENDINC XY" command in step 113, the position controller begins the move to $Z_d$ in response to the array supplied by the path generator once X and Y have been commanded to $X_c$, $Y_c$. Additionally, in step 113, a bell may be armed to signal once the actual Z position is greater than a selected height value $Z_{f1}$.

An interrupt is indicated at step 115 to signal the associated wire bonding apparatus that $Z_{f1}$ has been passed. The associated wire bonding apparatus can then begin some external process such as closing a wire clamp.

The arc depicted from point d to point g is executed by steps 119, 121, 125, 127, 131 and 133. The commands in these steps successively supply the position control apparatus with the arrays necessary to move X, Y and Z successively to $X_e$, $Y_e$, $Z_e$; $X_f$, $Y_f$, $Z_f$, and $X_g$, $Y_g$, $Z_g$. The respective GO commands 121, 127 and 133 initiate the position control routine illustrated in FIGS. 4 and 5 for each dimension to successively move the robot member to the respective positions.

The search Z command 139 (FIG. 10) indicates generation of a special trajectory array to Z. This array has embedded commands to search the Z axis in the down direction at a given velocity until "touch" is sensed. In step 141, "GO Z PENDINM XY" starts the Z search once X and Y have completely settled at $X_g$, $Y_g$. Again, the special trajectory array is supplied to the position control apparatus, which performs the operations illustrated in FIGS. 4 and 5 to bring the robot member to the desired position. The GO command 143 provides an interrupt to the associated apparatus once touchdown has occurred.

The foregoing preferred embodiment achieves the combination of open loop and feedback control to more accurately position a robot or other member. The preferred embodiment coordinates motion on multiple axes by controlling position and velocity through the whole range of the move, as illustrated in connection with FIG. 6b. Those skilled in the art will appreciate that various modifications and adaptations of the disclosed preferred embodiment may be made without departing from the scope and spirit of the invention. Therefore, it is to be understood that, within the scope of the appended claims, the invention may be practiced other than as specifically described herein.

What is claimed is:

1. An axis controller adapted to be supplied with target path positional information for generating a position control signal for establishing an actual position for a selected plant comprising:
   means receiving said target path positional information as its only position-related input for filtering said target path positional information to generate an open loop positional control signal;
   means responsive to said actual position and said target path positional information for generating a feedback control signal; and
   means for generating said position control signal from said open loop positional control signal and said feedback control signal.

2. The axis controller of claim 1 wherein said means for filtering comprises means for combining said target path positional information with the inverse of the transfer function of a model of said plant to generate said open loop control signal.

3. The axis controller of claim 1 wherein said positional information comprises digital data and wherein said means for filtering comprises a digital filter means for performing a digital filtering operation on said digital data to produce an open loop control signal.

4. The axis controller of claim 3 wherein said actual position is represented by a digital position signal and said means for generating a feedback control signal comprises:
   means for subtracting said digital data from said actual digital position signal to produce an error signal; and
   means for applying a feedback control transfer function to said error signal and outputting a feedback control signal.

5. The axis controller of claim 4 wherein said means for generating said position control signal includes means for adding said feedback control signal and open loop control signal to generate said position control signal, and converter means for converting said position control signal to an output signal.

6. The axis controller of claim 5 wherein said plant comprises:
   amplifier means for receiving said output signal as an input and having an output;
   motor means for providing a positional movement in response to the output of said amplifier means; and
   encoder means for tracking the positional movement of said motor means.

7. The axis controller of claim 6 wherein said amplifier means comprises a voltage controlled amplifier.

8. The axis controller of claim 7 wherein said encoder means further provides said digital position 9. The axis controller of claim 3 wherein said digital filter means comprises a programmed digital processor.

10. The axis controller of claim 9 wherein said programmed digital processor comprises means for generates said feedback control signal.

11. The axis controller of claim 10 wherein said programmed digital processor means generates said position control signal.

12. Robotic apparatus including a positionable robotic member, said apparatus adapted to be supplied with digital target path positional data, and comprising:
   digital processor means for generating an open loop control signal from said digital data, responsive to an error signal for generating a feedback control signal from said digital data and for generating a position control signal from said open loop and feedback control signals;
   means responsive to said position control signal for positioning said robotic member; and
   means responsive to the actual position of said robotic member for generating said error signal and supplying it to said digital processor means.

13. The robotic apparatus of claim 12 wherein said digital processor means generates said open loop control signal by subjecting said digital data to a digital filtering operation.

14. The robotic apparatus of claim 13 wherein said positionable robotic member is represented by a plant transfer function and wherein said digital filtering operation is performed according to a filter function which comprises the inverse of said plant transfer function.

15. The robotic apparatus of claim 14 wherein said digital processor means generates said feedback signal by subtracting said error signal from said digital data and applying a feedback control transfer function to the result of the subtraction.

16. The robotic apparatus of claim 15 wherein said positioning means comprises: amplifier means; and motor means responsive to the output of the amplifier means.

17. The robotic apparatus of claim 16 wherein said error signal generating means comprises encoder means responsive to the position of said motor means to generate said error signal.

18. A method for generating a position control signal for establishing an actual position for a selected plant from target path positional information, comprising the steps of:

generating an open loop positional control signal from said target path positional information utilizing an expression derived from the transfer function of a model of said plant;

generating a feedback control signal from said actual position and said target path positional information; and generating said position control signal from said open loop positional control signal and said feedback control signal.

19. The method of claim 18 wherein said positional information comprises digital data and wherein said step of filtering comprises performing a digital filtering operation on said digital data to produce an open loop control signal.

20. The method of claim 19 wherein said actual position is represented by a digital position signal and said step of generating a feedback control signal comprises the steps of:

subtracting said digital data from said actual digital position signal to produce an error signal; and applying a feedback control transfer function to said error signal and outputting a feedback control signal.

* * * * *